April 5, 1938.　　　　T. JOHNSON　　　　2,113,511
DIFFERENTIAL
Original Filed Oct. 17, 1934　　2 Sheets-Sheet 1
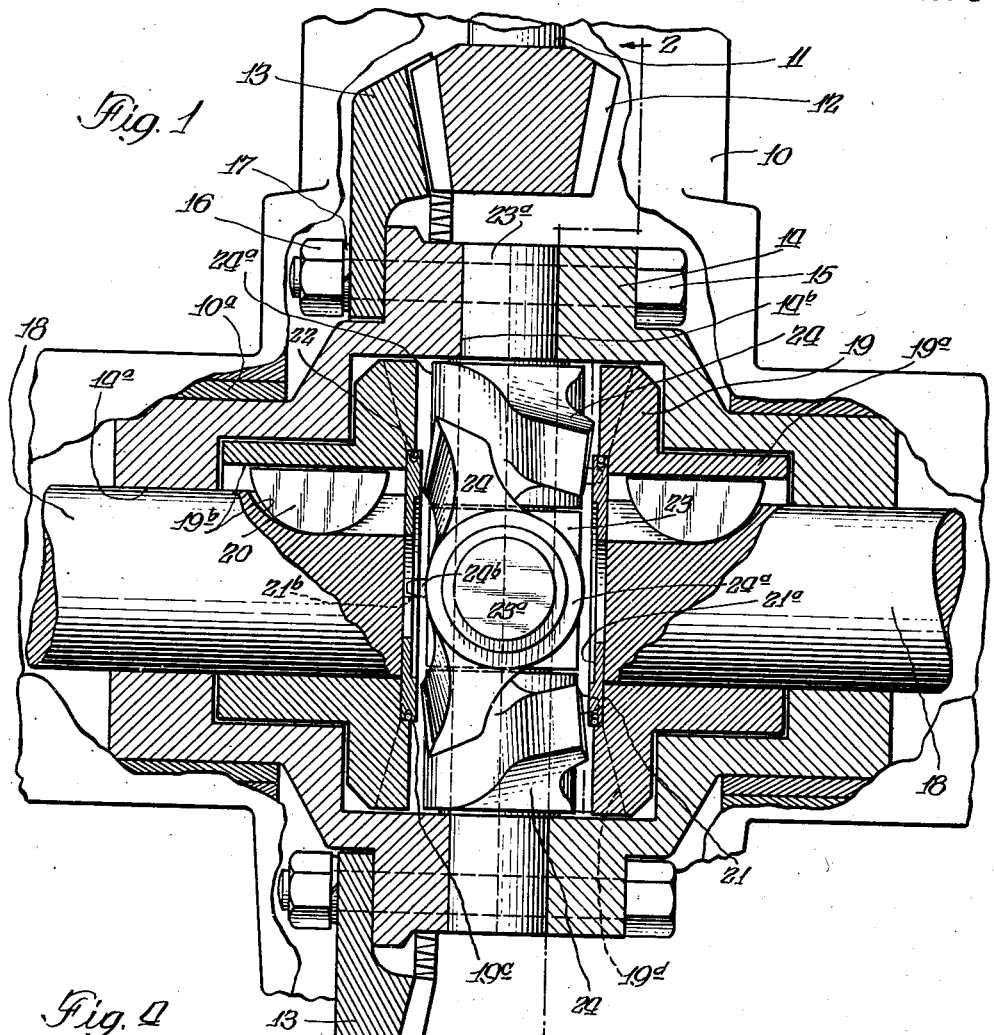
Inventor:
Theodore Johnson.
By: Stevens＋Batchelor
Atty's.

April 5, 1938.  T. JOHNSON  2,113,511
DIFFERENTIAL
Original Filed Oct. 17, 1934  2 Sheets-Sheet 2
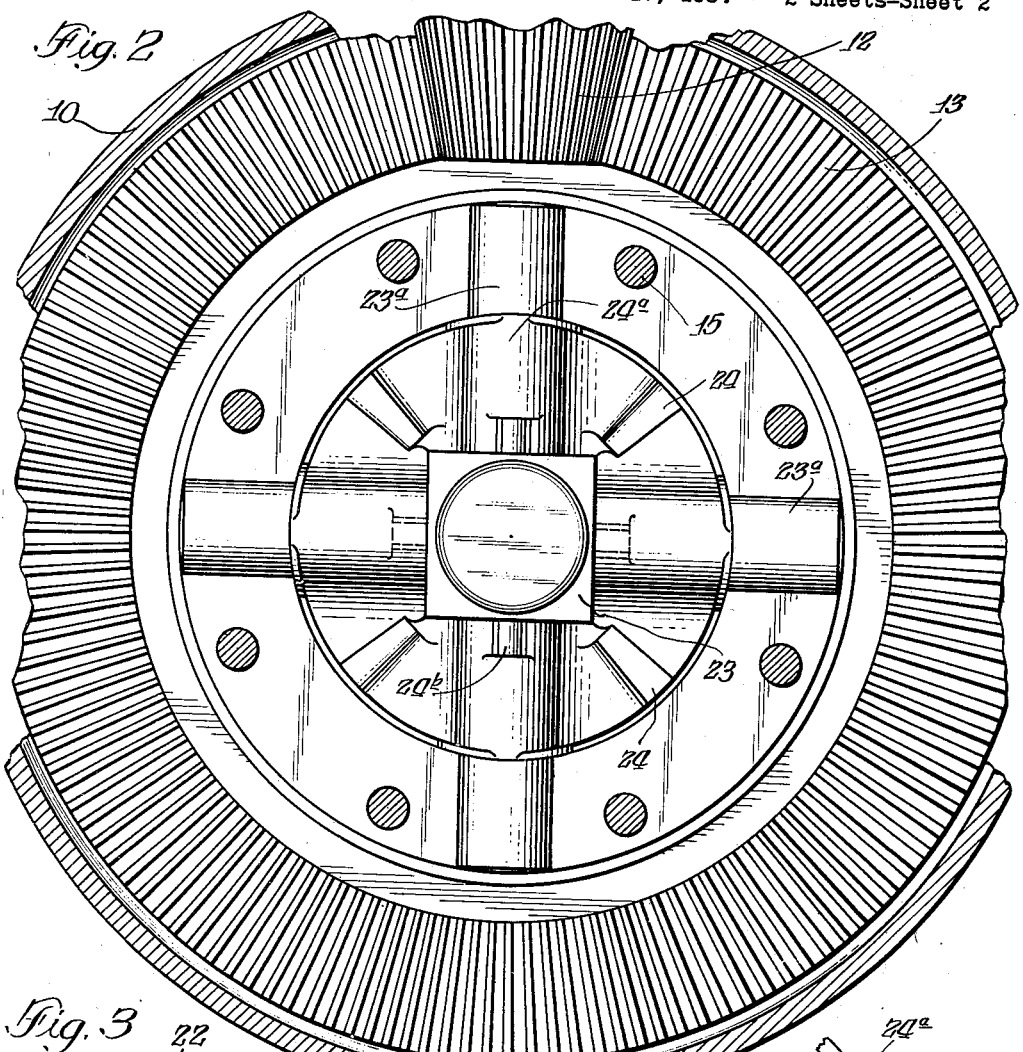
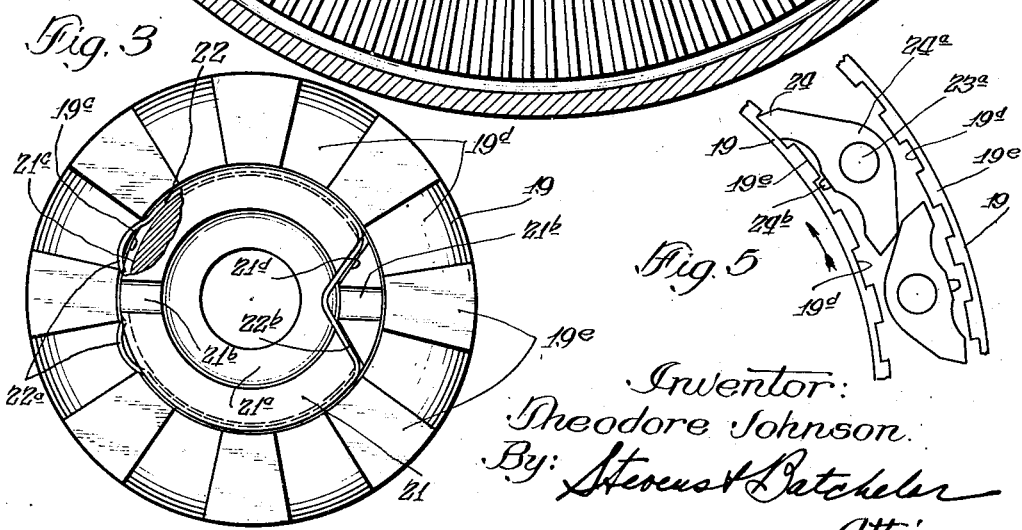
Inventor:
Theodore Johnson.
By: Stevens & Batcheler
Atty's.

Patented Apr. 5, 1938

2,113,511

UNITED STATES PATENT OFFICE 2,113,511

DIFFERENTIAL

Theodore Johnson, Chicago, Ill.

Substitute for application Serial No. 748,731, October 17, 1934. This application May 20, 1937, Serial No. 143,863

11 Claims. (Cl. 74—389.5)

My invention relates to differentials for motor car axles, and my main object is to produce a differential in which the driving element draws jointly on the ground wheels at all times.

A further object of the invention is to design the novel differential without any gears beyond those necessary to drive it.

A still further object of the invention is to build the novel differential in a compact and self-contained unit for maximum rigidity.

An additional object of the invention is to interconnect the driving elements for positive co-action.

Another object of the invention is to use a series of sturdy pawls as driving elements, these pawls being of simple design.

An important object of the invention is to employ a minimum number of parts which are easily accessible and replaceable.

This application is a refile of abandoned application Serial No. 748,731, filed Oct. 17, 1934.

With the above objects in view and any others that may suggest themselves from the specification and claims to follow, a better understanding of the invention may be had by reference to the accompanying drawings, in which—

Fig. 1 is a plan section of the novel differential with the housing therefor broken away;

Fig. 2 is a section on the line 2—2 of Fig. 1;

Fig. 3 is a face view, partly in section, of a driven assembly;

Fig. 4 is an edge view of the said assembly; and

Fig. 5 is a diagrammatic detail showing an incident in the operation of the differential.

Referring specifically to the drawings, 10 denotes a typical differential housing as employed for motor vehicles, 11 being the propeller shaft, 12 the pinion, and 13 the ring gear entering into conventional differential design.

In the development of the novel differential, I apply the ring gear 13 to one of two cups 14 of massive construction, these combining to produce a housing-like unit. The cups are periodically secured to each other by a series of bolts 15, nuts 16 and lock washers 17, one end of the unit receiving the ring gear 13 as clearly shown in Figure 1, and the bolts passing through the cups to receive the lock washers and nuts and firmly secure the ring gear to the unit. The latter is rotatably disposed in the housing 10 by means of suitable bearings 10a, and its ends are axially perforated as indicated at 14a for the entrance of the axle shafts 18.

Each of the axle shafts 18 carries on its inner end a circular disk 19 which is extended outwardly with a hub 19a tightly fitted upon the axle shaft. The ring and the axle shaft are in addition grooved as indicated at 19b to receive a key 20 which positively fixes the disk and shaft against relative rotary motion. The cup unit 14 is internally recessed to accommodate the disk and hub of each axle shaft, such disk and hub being clear of the walls of the cup unit. Each of the disks 19 is formed on its inner face with a shallow circular recess 19c of relatively large diameter; and from the periphery of this recess the disk is cut with a series of radial grooves 19d of progressive width and depth defining sector-shaped teeth 19e. In the circular recess 19c is freely seated a flat ring 21 having an inner section 21a sunken from its outer face and the latter grooved at 21b at diametrically-opposite points. The periphery of the ring is also longitudinally grooved at 21c to receive a substantial circular wire spring 22. The latter adjoins the inner ends of the disk teeth 19e, and its end portions 22a occur on opposite sides of one of the teeth, as seen in Figure 3. These end portions are outwardly arched to seat in the corresponding tooth grooves 19d from the outward or expansive tension of the spring. The portions 22a are, however, yieldable where pressed inwardly, and the peripheral ring groove 21c is of extra depth to afford room for the contraction of the spring in such event. For purposes of retention, the middle portion 22b of the spring is indented to seat in convergent grooves 21d of the ring 21 and forming continuations of the peripheral groove 21c.

In the center of the cup unit 14 is a spider 23 disposed in a plane transverse to the shafts 18 and having four equi-distant arms 23a. These are lodged in radial bores 14b made in the cup unit 14 along the joint of its sections, the bolts 15 serving to secure the spider arms rigidly relative to the cup unit. The hub and arms of the spider 23 are preferably forged in a single piece of gear metal, which is hard as well as tough. Between the hub of the spider and the peripheral wall of the cup unit, the spider arms receive in freely rotatable relation the hubs 24a of double-pointed pawls 24. Each pawl structure and its hub is forged from a single piece of gear metal, and the points of the pawls on a given pair of alined spider arms 23a are directed toward one disk 19 while the points of the pawls on the alternate alined spider arms are directed toward the other disk 19.

Each of the pawls 24 is intended to have a certain relation with the teeth 19e of its intimate disk 19 as well as with the grooves 19d between such teeth. As the teeth and grooves are in a sectoral arrangement about a center, each pawl is also fashioned in the nature of a sector and with its points so projected that a limited rocking motion of the pawl in one direction will project a point in the path of a disk tooth 19e that may approach it when the disk is rotated to correspond; and a duplicate action occurs for the other point of the pawl when similar movements apply in the reverse direction. It will now be understood that with the spider constituting the driving member in the differential and the array of pawls carried by the spider and freely rockable on the respective arms, the projection of the pawl points in a given direction relative to the disks 19 will procure the driving thereof in the same direction and the consequent uniform rotation of the axle shafts 18.

From the hub 24a of each pawl 24 a lug 24b projects toward the related disk 19 and into the correspondingly located ring groove 21b. It is seen that the spring arches 22a lock the disk and ring from relative rotation, so that these parts may under ordinary circumstances be considered as a unit in relation to the pawls. Thus, when the spider 23 moves relative to a given disk the forward edge of each ring groove 21b forms an abutment to the advancing pawl lug 24b, and constitutes the latter as a lever to procure the rocking of its pawl whereby to project the forward point of the pawl into a tooth groove of the disk, the teeth and spaces of the latter being dimensioned relative to the length of the pawl to render the action described certain. This places the pawl point directly behind the next forward disk tooth, and the rotative effort of the spider will be transmitted to the disk to turn the corresponding shaft 18. The action just described is illustrated clearly by the position of the upper pawl in the diagram of Figure 5. It will be understood that all the pawls will be affected similarly whereby to secure a concerted drive therefrom to the disks 19.

Since the pawls are double pointed and identically operative in either direction as well as effective on their related disks, it will be seen that neither of the shafts is reversible as long as the spider drive is in a given direction. When motor vehicles are considered in this light, the advantage is freedom from skidding.

The differential action in the novel embodiment is largely dependent upon the design of the pawls. Thus, by referring to Figure 5 in which a rotary succession of two pawls is illustrated, it is easy to understand that the upper pawl is driving the left-hand disk 19 in the direction of the arrow. However, in the event that the right-hand disk over-runs the spider in the direction of the arrow, the first effect is for the disk tooth behind the frontal point of the lower pawl to force such tooth out of contact with the right-hand disk. The lower pawl being freely rockable, the effect of this action would be to project its rear point (bottom) into a disk tooth and stop the over-running disk at once. However, the backs of the pawls adjacent to the teeth thereof are of such a prominence that the back of the departing portion of the lower pawl, as clearly shown in Figure 5, so that the lower pawl is prevented from swinging further than the neutral position indicated. The over-running disk is thus free of the pawls related to it. However, as soon as the said disk falls below the speed of the spider, the ordinary action between the pawls and the disks will resume, re-establishing the driving connection.

It should now be apparent that, with the disk rings 21 interconnected with their related pawls by the pawl lugs 24b, the over-running of a disk relative to the spider constitutes a rotary departure of the disk from a given position about its ring. Such departure is against the tension of the spring 22 and is characterized by the tripping of the spring arches 22a between the passing disk teeth 19e. This action is smooth, due to the slight incline of the arches and the easy yield of the particular type of spring; also the extent of the over-run will not be great, as usually the inner wheel of a turning vehicle is moving in a circle of appreciable size while the outer wheel is describing a circle of greater size.

It will be seen that I have provided a rugged and simple structure in the novel differential. The massive character of the cup unit 14 lends maximum rigidity to the driving spider; also, it forms an inner housing which may be filled with oil to last a long period, the oil being of a grade to insure the free action of the pawls and the springs 22. Or, if the grease in the axle housing is suitable for this purpose, the cup unit could be drilled with holes or built like a cage for access of the lubricant to the pawls and springs.

It will be evident that no parts of a delicate character are involved in the motive elements of the differential. The pawls are of a rugged design, they are positively connected for concerted action in pairs in case one pawl fails, and they require very little lubricant on account of their limited rocking movement; and the tooth formation of the disks does not require extreme accuracy as in the case of gears. Also, the springs are long, flexed to a slight degree and under no appreciable strain. Thus, my differential is essentially gearless which fact cuts the expense of its manufacture to a comparatively low figure, and provides a unit which is strong, safe and durable.

I claim:

1. A differential comprising a radially-armed spider as a driving element between the ends of the driven shafts, disks mounted on such ends, double pointed pawls fulcrumed on the spider arms and rockable relative to the disks, said arms being in the same plane, and abutments carried by the disks and engageable by the pawls on the motion of the spider, the points of certain pawls being directed toward one disk and those of other pawls toward the other disk.

2. A differential comprising a spider as a driving element between the ends of the driven shafts, disks mounted on such ends, double-pointed pawls carried by the spider arms and rockable relative to the disks, and abutments carried by the latter and engageable by the pawls on the motion of the spider, the points of pawls on consecutive spider arms being directed alternately toward one and the other disk.

3. A differential comprising a radially-armed spider as a driving element between the ends of the driven shafts, disks mounted on such ends, double pointed pawls fulcrumed on the spider arms and with their points directed toward the disks, co-operative elements between the pawls and the disks to rock the pawls and apply the forepoints thereof to their related disks when the spider is rotated in the corresponding direction, and abutments carried by the disks and engageable by the pawl forepoints to drive said shafts in unison.

4. A differential comprising a spider with diametrically alined arms as a driving element between the ends of the driven shafts, disks mounted on such ends, double pointed pawls fulcrumed on the spider arms, the pawls on each pair of alined arms having their points directed toward a given disk, co-operative elements between the pawls and the disks to rock the pawls on each pair of alined arms in opposite directions whereby to apply the forepoints thereof to their related disks when the spider is rotated in the corresponding direction, and abutments carried by the disks and engageable by the pawl forepoints to drive said shafts in unison.

5. A differential comprising a spider as a driving element between the ends of the driven shafts, disks mounted on such ends, double-pointed pawls carried by the spider arms and rockable relative to the disks, and abutments carried by the latter and engageable by the pawls on the motion of the spider, the pawls being in intimate rotary succession to an extent that the engagement of the forepoint of one pawl with its related disk prevents the engagement of the rear point of the next following pawl with its related disk.

6. A differential comprising a driving element between the ends of the driven shafts, disks mounted on such ends, double-pointed pawls carried by the driving element and rockable relative to the disks, rings centered in the inner faces of disks, and having recesses in their contiguous faces, yieldable means connecting the disks and their rings against relative rotation, the points of certain pawls being directed toward one disk and those of the other pawls toward the other disk, projections from the middle portions of the pawls into the recesses of the rings pertaining to those disks toward which the pawls point whereby to rock the pawls and apply the forepoints thereof to their related disks when the spider is rotated in the corresponding direction, and abutments carried by the disks and engageable by the pawl forepoints to drive said shafts in unison.

7. The structure of claim 6, said abutments comprising a circular series of teeth on the contiguous faces of the disks, and said yieldable means comprising springs interposed between certain ones of the teeth and adapted to be tripped by the latter when a disk over-runs its ring.

8. The structure of claim 6, said abutments comprising a circular series of teeth on the contiguous faces of the disks, the periphery of each ring being opposite the inner edges of the teeth of the related disk and longitudinally grooved, and said yieldable means comprising a wire spring contained in the groove of each ring and formed with arched portions projected between certain ones of the disk teeth and adapted to be tripped by the latter when the disk over-runs its ring.

9. The structure of claim 6, said abutments comprising a circular series of teeth on the contiguous faces of the disks, the periphery of each ring being opposite the inner edges of the teeth of the related disk and longitudinally grooved, and said yieldable means comprising a wire spring contained in the groove of each ring and formed with arched portions projected between certain ones of the disk teeth and adapted to be tripped by the latter when the disk over-runs its ring, said arched portions being terminals of the spring.

10. The structure of claim 6, said abutments comprising a circular series of teeth on the contiguous faces of the disks, the periphery of each ring being opposite the inner edges of the teeth of the related disk and longitudinally grooved, and said yieldable means comprising a wire spring contained in the groove of each ring and formed with arched portions projected between certain ones of the disk teeth and adapted to be tripped by the latter when the disk over-runs its ring, said arched portions being terminals of the spring, and the ring being formed with slots to seat the medial portion of the spring and retain the latter against departure.

11. The structure of claim 6, the recesses of the rings being diametrically aligned and the projections from the middle portions of the pawls correspondingly disposed.

THEODORE JOHNSON.